(12) United States Patent
Reinhardt et al.

(10) Patent No.: US 11,465,443 B2
(45) Date of Patent: Oct. 11, 2022

(54) WHEEL WITH BEAD LOCKS (71) Applicant: Bridgestone Americas Tire Operations, LLC, Nashville, TN (US)

(72) Inventors: Sharon E. Reinhardt, Fairlawn, OH (US); Dennis W. Snyder, Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 288 days.

(21) Appl. No.: 16/335,202

(22) PCT Filed: Sep. 20, 2017

(86) PCT No.: PCT/US2017/052370
§ 371 (c)(1),
(2) Date: Mar. 20, 2019

(87) PCT Pub. No.: WO2018/063867
PCT Pub. Date: Apr. 5, 2018

(65) Prior Publication Data
US 2019/0344616 A1 Nov. 14, 2019

Related U.S. Application Data (60) Provisional application No. 62/400,159, filed on Sep. 27, 2016.

(51) Int. Cl.
*B60B 21/10* (2006.01)
*B60B 25/00* (2006.01)
*B60C 15/02* (2006.01)

(52) U.S. Cl.
CPC .......... *B60B 21/10* (2013.01); *B60B 25/006* (2013.01); *B60B 25/008* (2013.01); *B60C 15/0226* (2013.01)

(58) Field of Classification Search
CPC ..... B60C 15/0226; B60B 21/10; B60B 21/12; B60B 25/006; B60B 25/008; B60B 21/125
See application file for complete search history.

(56) References Cited

U.S. PATENT DOCUMENTS 512,917 A * 1/1894 Stead .................. B60C 15/0226
152/384
1,092,078 A * 3/1914 Overman .................. B60C 7/12
152/325
1,396,515 A * 11/1921 McClevey ............ B60C 15/024
152/384

(Continued)

FOREIGN PATENT DOCUMENTS

CN 202080068 12/2011
CN 203818931 9/2014

(Continued)

OTHER PUBLICATIONS

International Search Report and Written Opinion; Corresponding U.S. PCT Application No. PCT/US2017/052370; Authorized Officer Jin Ho Kim; dated Feb. 7, 2018.

*Primary Examiner* — Kip T Kotter (57) ABSTRACT

A wheel includes a hub and a rim portion surrounding the hub. An outer surface of the rim portion defines a circumference of the wheel. The outer surface of the rim portion has a plurality of bead locks that are spaced from one another.

13 Claims, 4 Drawing Sheets

(56) References Cited

U.S. PATENT DOCUMENTS

| | | | |
|---|---|---|---|
| 3,977,727 A * | 8/1976 | Glasenapp | B60B 21/10 152/384 |
| 4,015,652 A | 4/1977 | Harris | |
| 4,184,531 A * | 1/1980 | Honigsbaum | B60B 21/10 152/379.3 |
| 4,190,092 A | 2/1980 | Evans et al. | |
| 4,274,465 A | 6/1981 | French et al. | |
| 4,274,466 A | 6/1981 | French et al. | |
| 4,325,422 A * | 4/1982 | Corner | B60B 21/10 152/209.1 |
| 4,561,481 A | 12/1985 | Kawauchi et al. | |
| 4,878,527 A * | 11/1989 | Noma | B60B 21/10 152/379.3 |
| 5,044,413 A | 9/1991 | Noma et al. | |
| 5,253,692 A * | 10/1993 | Stephens | B60C 15/0226 152/543 |
| 5,279,347 A * | 1/1994 | Stephens | B60C 15/0226 152/379.5 |
| 6,000,762 A * | 12/1999 | Chang | B60B 3/08 152/DIG. 10 |
| 8,714,217 B2 | 5/2014 | Chon et al. | |
| 8,973,632 B2 * | 3/2015 | Mancini | B60B 21/102 152/379.5 |
| 2003/0098109 A1 * | 5/2003 | Bouvier | B60B 21/104 152/158 |
| 2005/0264096 A1 | 12/2005 | Hodges et al. | |
| 2006/0219368 A1 | 10/2006 | Hirata et al. | |
| 2014/0020817 A1 | 1/2014 | Williams et al. | |
| 2015/0283857 A1 * | 10/2015 | Asper | B29D 30/30 152/5 |
| 2017/0174002 A1 * | 6/2017 | Downing | B60C 7/24 |

FOREIGN PATENT DOCUMENTS

| | | | |
|---|---|---|---|
| CN | 203854426 | 10/2014 | |
| EP | 0334955 | 10/1989 | |
| JP | 05169901 A * | 7/1993 | |
| JP | 06135202 A * | 5/1994 | |
| JP | 2006027569 | 2/2006 | |
| JP | 2009220695 A * | 10/2009 | |
| KR | 20060061115 A * | 6/2006 | |
| KR | 2007037217 | 4/2007 | |
| KR | 2007046367 | 5/2007 | |
| KR | 2007055134 | 5/2007 | |
| KR | 20130076305 A * | 7/2013 | |
| KR | 20150019637 A * | 2/2015 | |
| TW | M473316 | 3/2014 | |
| WO | WO-0125030 A1 * | 4/2001 | B60B 21/00 |
| WO | 2014148824 | 9/2014 | |
| WO | 2015072183 | 5/2015 | |
| WO | 2015120015 | 8/2015 | |

\* cited by examiner

WHEEL WITH BEAD LOCKS

FIELD OF INVENTION

The present disclosure is directed to a wheel that prevents slippage between a tire and the wheel. More particularly, the present disclosure is directed to a wheel that includes features that interact with a tire bead to prevent the tire from slipping with respect to the wheel.

BACKGROUND

Pneumatic tires are known to include a pair of beads, one or more carcass plies extending from bead to bead, at least one belt ply, a circumferential tread, and sidewalls, in addition to other components. Pneumatic tires are filled with air and are maintained at a desired air pressure.

"Run flat tires" may be used in applications where the tire may continue to operate for extended periods of time and at relatively high speeds after receiving a puncture and a complete or partial loss of pressurized air. Non-pneumatic tires do not require inflation, and are typically used in applications where a durable tire operated at low speeds is preferable, such as in agriculture. Non-pneumatic tires and pneumatic tires (including run flat tires) are susceptible to rim slip, caused by a loose interface between the tire bead and the rim of a wheel to which the tire is attached. Rim slip results in reduced efficiency and performance of the tire.

SUMMARY

In one embodiment, a two-piece wheel includes first and second wheel pieces having first and second threaded holes, and a threaded rod extending between the threaded holes. The threaded rod is configured to change the axial distance between the first and second wheel pieces when it is turned. The two-piece wheel further includes a plurality of bead locks along the rims of the first and second wheel pieces, wherein the rims are configured for receiving a tire.

Further, each bead lock may include a sharp edge. Each bead lock further may be spaced from an axially outer edge of the wheel piece it is located on. The bead locks on each wheel piece may be spaced at least five degrees apart from one another, as measured from an axis of rotation of the respective wheel piece. The bead locks may extend a full width of the rim portions. The bead locks on the first wheel piece may be axially misaligned with the bead locks on the second wheel piece. The bead locks on the wheel pieces may be configured to mate with corresponding notches in the tire.

In another embodiment, a wheel includes a hub, a rim portion surrounding the hub, and wherein the outer surface of the rim portion defines a circumference of the wheel. Multiple bead locks are located on the outer surface of the rim portion and the bead locks are spaced from one another.

Further, the outer surface of the rim portion may be knurled for receiving a tire. The wheel may further include a friction pad on an outer surface of the rim for receiving a tire. The bead locks may be configured to mate with notches in a tire. Half of the bead locks may be located on an axially inner side of the wheel, and half of the bead locks may be located on an axially outer side of the wheel. The bead locks located on the axially inner side of the wheel may be axially misaligned with the bead locks located on the axially outer side of the wheel. The bead locks may be rectangular in cross section, and may include sharp edges. The bead lock may be spaced from an axially outer edge of the wheel.

In yet another embodiment, a tire and wheel assembly includes a tire having a bead portion, a sidewall, and a tread, wherein the bead portion is connected to the tread via the sidewall and wherein the wheel has a hub portion and a rim portion. The assembly further includes a plurality of bead locks located on the rim portion of the wheel and a plurality of notches located on the bead portion of the tire, corresponding to the plurality of bead locks located on the rim portion of the wheel.

Further, the bead locks may have a rectangular cross section. Half of the bead locks may be located on an axially inner side of the wheel, and half of the bead locks may be located on an axially outer side of the wheel. Half of the notches may be located on an axially inner bead of the tire, and half of the notches may be located on an axially outer bead of the tire. The notches and bead locks on the axially inner side of the tire and wheel may be axially misaligned with the notches and bead locks on the axially outer side of the tire and wheel, respectively.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Tread" refers to that portion of the tire that comes into contact with the road under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it is understood that because the terms carry slightly different connotations, one of ordinary skill in the art would not consider any one of the following terms to be purely interchangeable with another term used to describe a common tire component.

Figure 1:
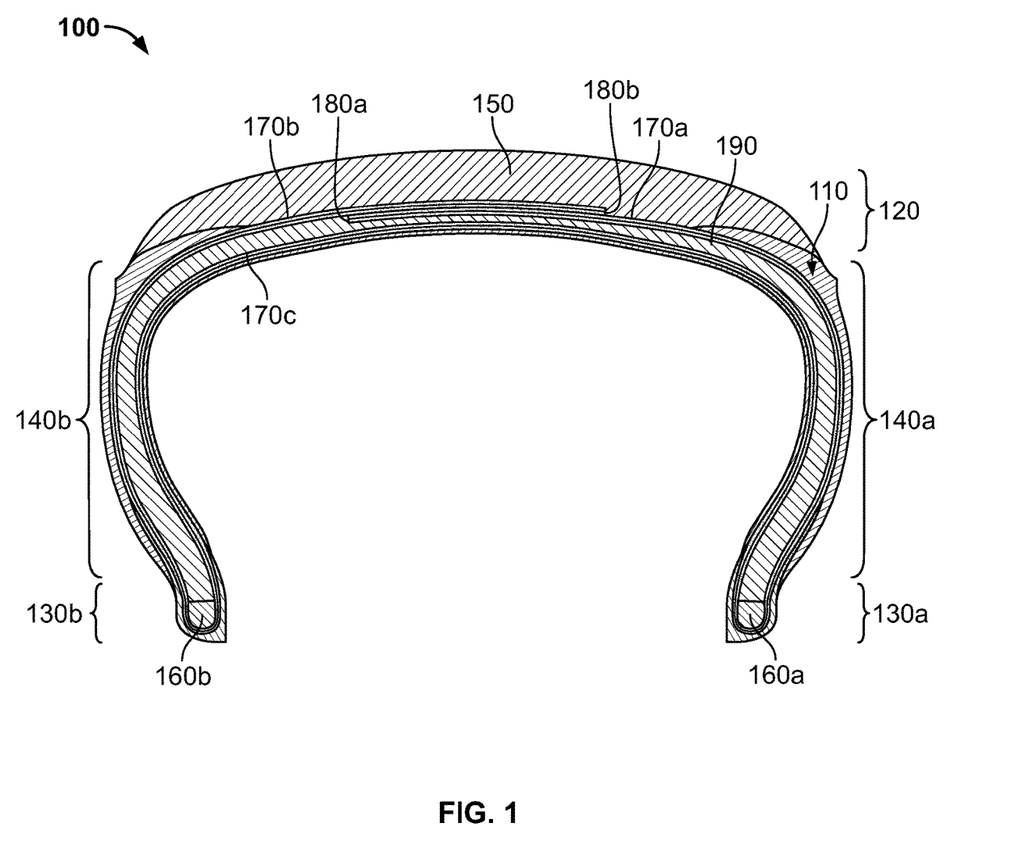
FIG. 1 is a cross sectional view of a tire having a toroidal element according to an embodiment of the present disclosure.

FIG. 1 is a cross-section of one embodiment of a non-pneumatic tire 100 having a toroidal element 110 incorporated therein. Exemplary non-pneumatic tires with toroidal elements are described in U.S. Patent Application Publication Nos. 2015/0083296 and 2015/0283857, the disclosures of which are incorporated by reference herein in their entirety.

Tire 100 includes a crown region 120, a pair of bead regions, including a first bead region 130a and a second bead region 130b, and a pair of sidewall regions 140a,b extending from the crown region 120 to the bead regions 130a, 130b. A tread 150 is formed in the crown region 120 of the tire. Each bead region 130a, 130b includes a bead 160a, 160b and may optionally include a bead filler (not shown), a gum abrasion strip (not shown), and other components therein.

Tire 100 further includes a pair of body plies 4-74 having first turned-up portions 170a, second turned up portions 170b, and main portions 170c. The main portions 170c extend circumferentially about the tire from a first bead 160a to a second bead 160b. The first turned-up portions 170a extend around the first bead 160a and terminate at a first end 180a in the crown region 120 of the tire 100. The second turned-up portions 170b extend around the second bead 160b and terminate at a second end 180b in the crown region 120 of the tire 100, such that the first turned-up portions 170a overlaps the second turned-up portions 170b. In an alternative embodiment (not shown), the first turned-up portion does not overlap the second turned-up portion. Instead, additional plies span the crown region overlapping both turn-up ends. While a pair of body plies are shown in FIG. 1, it should be understood that this is for illustrative purposes. In a commercialized embodiment, the tire may include a single body ply, or three or more body plies.

Construction of body plies is known in the art. The body plies may include rubber and reinforcement cords constructed of fabric such as cotton, rayon, nylon, polyester, aramid fibers, or metal. The body plies may be described as inextensible.

In the illustrated embodiment, the toroidal element 110 includes the body ply cords as well as an inner rubber component 190. The rubber component 190 is sandwiched between the main portions 170c of the body plies and the turned up portions 170a,b. The toroidal element 110 therefore stretches from bead to bead, and includes the beads 160a,b. The resulting structure is shaped like a traditional pneumatic tire, but is sufficiently stiff enough to carry loads typical of a similarly sized pneumatic tire without requiring internal air pressure for preload. The design does not preclude or require the use of internal air pressure.

While the illustrated embodiments generally show a rubber portion 190 disposed between a main portion 170c of a body ply and turn up portions 170a,b of the body ply, it should be understood that any combination of rubber layers and body ply layers may be employed. The body ply layers may be formed of a single body ply that forms a main portion and turned-up portions, or a main portion and turned-down portion. The body ply layers may also be formed of multiple body plies that form multiple main portions and multiple turned-up portions, or multiple main portions and multiple turned-down portions. The body ply layers may also be formed of separate body plies.

In an alternative embodiment (not shown), the toroidal element is a partial toroidal element that extends into one sidewall of the tire, but not both sidewalls.

The toroidal element 110 is configured to increase interlaminar shear strength across the axial length of the tire 100 as well as in the sidewall regions 140 of the tire. As one of ordinary skill in the art would understand, the tire 100 may also include a belt (not shown) in the crown region 120. In one embodiment, the toroidal element 110 has a consistent thickness throughout. In an alternative embodiment, the toroidal element has a first thickness in the crown region and a second thickness greater than the first thickness in a region outside the belt. In another alternative embodiment, the toroidal element has a first thickness in the crown region and a second thickness less than the first thickness in a region outside the belt.

The initial shape of the tire 100 may be substantially parabolic, such that the beads 160a, 160b are located axially outside and radially below the tread 150. In alternative embodiments, the initial shape may be any curved shape in which the beads are located axially outside and radially below the tread. The pair of beads 160a, 160b of the unstressed tire 100 may then be moved axially inward, such that each of the pair of beads 160a, 160b is disposed directly below a portion of the tread 150, as shown in FIG. 1. In an alternative embodiment, the beads remain axially outside the tread 150.

Figure 2A:
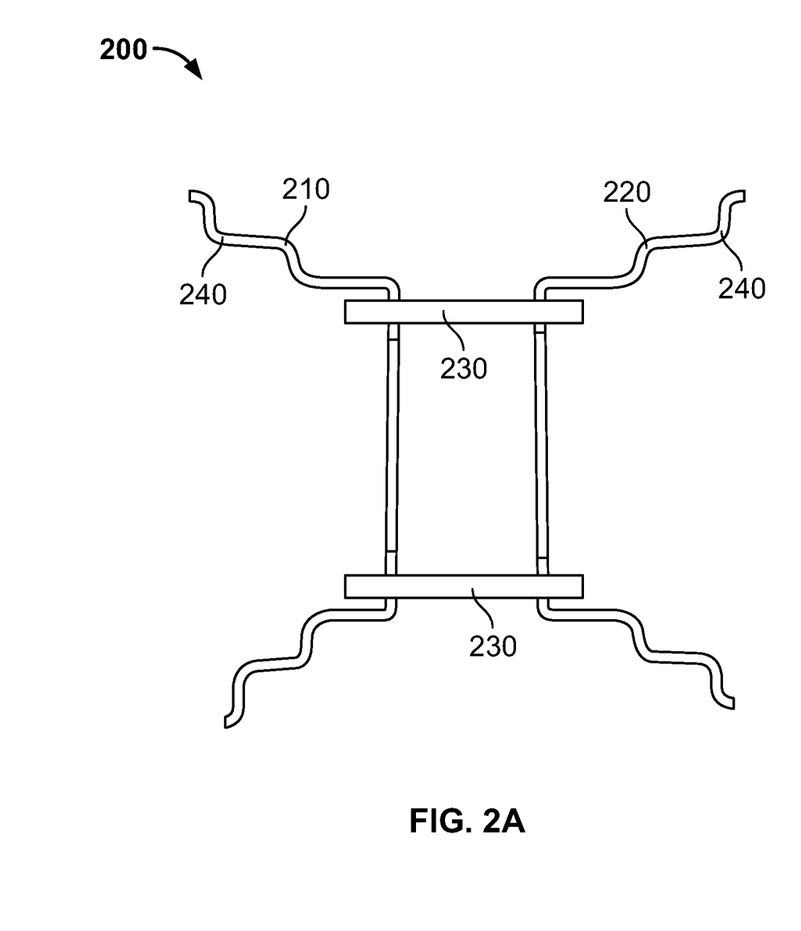
FIG. 2A is a cross sectional view of a two-piece wheel in an open configuration according to an embodiment of the present disclosure.

FIG. 2A is a cross section of one embodiment of a two-piece wheel 200, configured to receive a tire. The two-piece wheel 200 includes a first wheel piece 210 and a second wheel piece 220. The first and second wheel pieces 210, 220 are joined by one or more fasteners 230. FIG. 2A shows the two-piece wheel 200 in an open configuration, where the first and second wheel pieces 210, 220 are spaced from each other in an axial direction. In the open configuration, the two-piece wheel can receive the beads of a tire on rim portions 240, without increasing the tension within the tire. For example, when the two-piece wheel 200 is in an open configuration, it can receive tire 100 if its beads are located axially outside and radially below the tread. Additionally, the two-piece wheel 200 can be used with other pneumatic or non-pneumatic tires, instead of tire 100 described above.

Figure 2B:
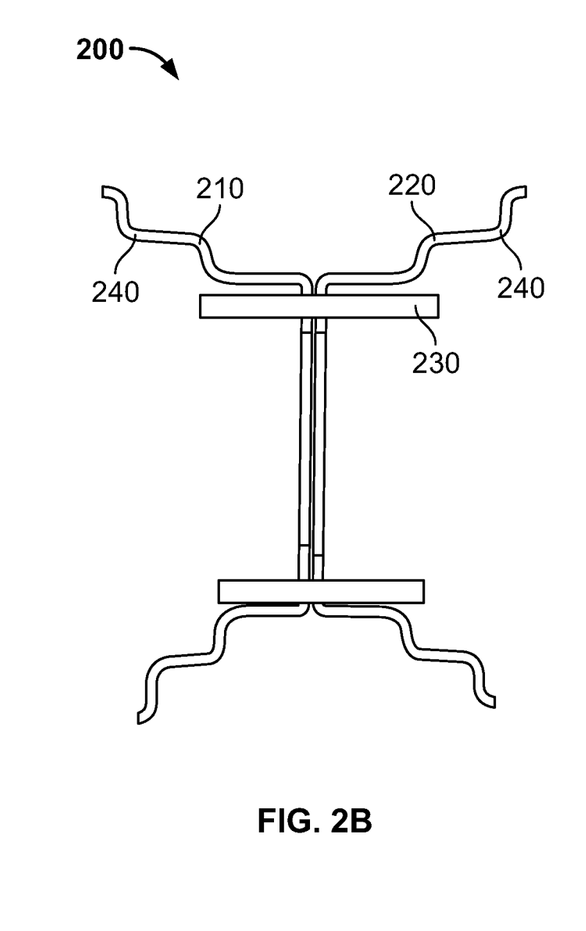
FIG. 2B is a cross sectional view of a two-piece wheel in a closed configuration according to FIG. 2A.

FIG. 2B shows the two-piece wheel 200 in a closed configuration, where the first and second wheel pieces 210, 220 are adjacent to one another, and meet at an equatorial plane of the tire. When the two-piece wheel 200 is moved to the closed position, the rim portions 240 apply an inward force on the beads of the tire, moving the beads inwards such that they are below the tread of the tire. In the closed configuration, the two-piece wheel 200 pre-tensions the tire, improving the tire's performance.

In one known embodiment, moving the pair of bead regions axially inward includes applying at least 1000 pounds of force to move the pair of bead regions axially inward. In this embodiment, when the tire is mounted on the rim, the pre-stressed tire 100 applies an outward force of at least 1000 pounds against the wheel rim portions. In another known embodiment, moving the pair of bead regions axially inward includes applying at least 5000 pounds of force to move the pair of bead regions axially inward. In this embodiment, when the tire is mounted on the rim, the pre-stressed tire applies an outward force of at least 5000 pounds against the wheel rim portions.

Analysis of a pre-stressed tire of the above design shows that the tire would have a contact patch similar to a pneumatic tire, even when no inflation pressure is applied to the tire. This is because the cords develop similar forces in the contact region as the forces generated by the air pressure in a standard pneumatic tire. Compared to other non-pneumatic or run flat designs which rely on stiffness alone to carry the load, the contact of the pre-stressed tire results in a large contact area with lower contact pressure, which is more uniform. The design also exhibits lower propensity to buckle in the contact area. Buckling in this manner creates areas of lost contact or high contact pressure in the contact area.

Two-piece wheel 200 can be selectively configured in the open and closed configurations via the fastener 230. In the present embodiment, fastener 230 is a threaded rod, extending through two corresponding threaded through holes in first and second wheel pieces 210, 220. When fastener 230 is rotated in one direction, it draws first and second wheel pieces 210, 220 closer together, as shown in FIG. 2B. When fastener 230 is rotated in a different direction, the first and second wheel pieces 210, 220 are moved further apart, as seen in FIG. 2A. A lock or latch may be provided in threaded rod 230 to prevent threaded rod 230 from rotating while the wheel 200 is in operation.

In alternative embodiments (not shown), other types of fasteners may be used instead of the threaded rod, such as a bolt, a linkage, a clamp, or an adhesive. In other alternative embodiments (not shown), the fastener can be replaced by welding the first and second wheel pieces 210, 220 together.

Figure 3:
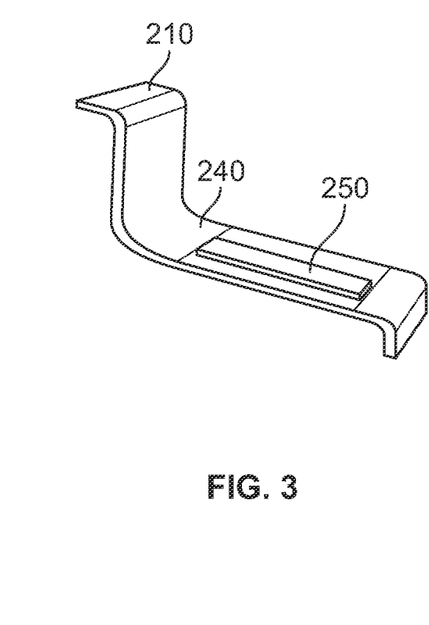
FIG. 3 is a detail view of a portion of the first wheel piece according to the embodiment of FIGS. 2A and 2B, having a locking bead affixed thereto.

FIG. 3 is a detailed view of one part of the first wheel portion 210, showing the rim 240 and a locking bead 250 disposed thereon. Locking bead 250 can be made integral with the first wheel portion 210, or can be welded on or otherwise affixed to the rim 240 as a separate piece. Locking bead 250 is spaced from the edges of rim 240 in this embodiment. In alternative embodiments (not shown), locking bead 250 can be located at the edge of rim 240, or it can extend the entire width of rim 240.

In the illustrated embodiment, locking bead 250 has a rectangular shape, and has at least one sharp edge that is configured to abut a corresponding notch in a tire, preventing the tire from slipping on the rim 240 during rotation of the tire. In alternative embodiments (not shown), the locking bead can take any geometric shape, including a rounded shape, a triangular shape, a square shape, a trapezoidal shape, or an irregular shape.

Figure 4:
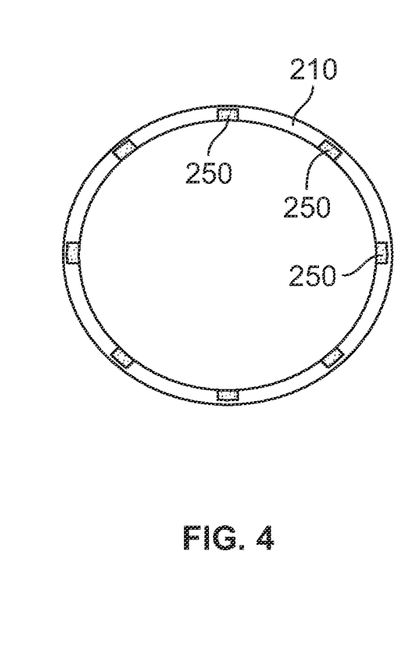
FIG. 4 is a cross section view of the entire first wheel piece according to the embodiments of FIGS. 2A and 2B, with multiple locking beads.

As seen in FIG. 4, a plurality of locking beads 250 is provided along the rim 240 of first wheel piece 210. Locking beads 250 can also be provided on the rim 240 of second wheel piece 220. In one embodiment, when locking beads 250 are included on both first and second wheel pieces 210, 220, the locking beads of the first wheel piece 210 are axially misaligned with the locking beads 250 of the second wheel piece 220. The axial misalignment of locking beads 250 improves the tire performance by ensuring that a locking bead 250 is located within a tire footprint at all times during a revolution of the tire. In alternative embodiments (not shown), the locking beads 250 can be axially aligned with each other on first and second wheel pieces 210, 220.

In the embodiment of FIG. 4, eight bead locks 250 are provided on each wheel piece 210, 220. In this embodiment, the bead locks 250 on each wheel piece are equally spaced apart. In other words, in the illustrated embodiment, the bead locks 250 on each wheel piece 210, 220 are spaced apart by an angular distance of 45 degrees. The wheel pieces 210, 220 may be aligned such that the bead locks 250 on opposing wheel pieces 210, 220 are spaced apart by an angular distance of 22.5 degrees. However, it should be understood that in this embodiment, the wheel pieces 210, 220 may be placed in any alignment, so that the bead locks on opposing wheels pieces 210, 220 may be spaced apart by any angular distance from 0 to 22.5 degrees.

While eight bead locks 250 are shown on the wheel piece 210 in FIG. 4, it should be understood that any number of bead locks may be employed. For example, in one known embodiment, each wheel piece has a single bead lock. The bead locks on the opposing wheel pieces may be aligned, such they are not spaced apart by any angular distance. Alternatively, the bead locks may be spaced apart by as much as 180 degrees.

In another known embodiment, each wheel piece has 36 bead locks equidistant about the wheel piece. The wheel pieces may be aligned such that the bead locks on opposing wheel pieces are spaced five degrees apart, as measured from an axis of rotation of the wheel pieces.

In the above-described embodiments, the wheel has between two and 72 bead locks. Thus, if the bead locks are equally spaced, each bead lock is spaced at least five degrees apart from an adjacent bead lock as measured from an axis of rotation of the respective wheel piece. While the examples above generally discuss equidistant bead locks, it should be understood that the bead locks may be irregular distances apart. It should also be understood that the wheel may employ a single bead lock, or more than 72 bead locks. The number of bead locks on each wheel piece can be selected according to the size of the wheel pieces or other design constraints. For example, larger wheel pieces may require a greater number of bead locks, while smaller wheel pieces may require fewer bead locks.

Figure 5:
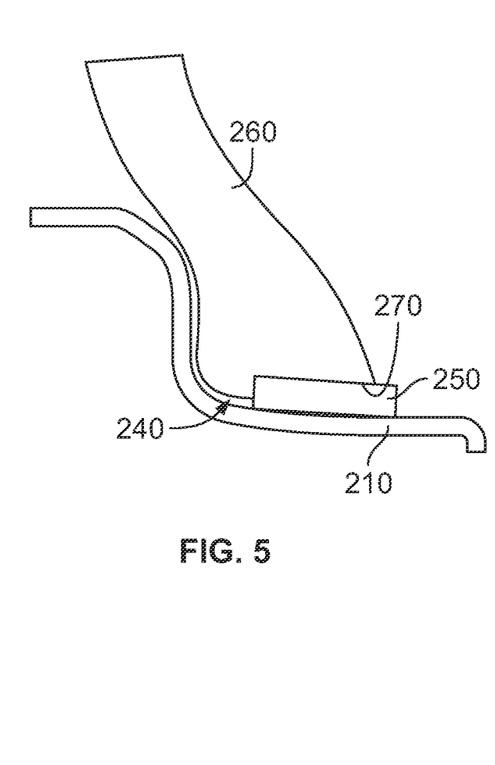
FIG. 5 is a detail cross sectional view of a portion of the first wheel piece according to the embodiments of FIGS. 2A and 2B, showing a tire installed on the first wheel portion.

FIG. 5 shows a cross sectional detail view of a tire 260 installed on rim 240. The tire 260 includes a notch 270 in the bead portion. Notch 270 is contoured to encompass locking bead 250, and provide a secure engagement between the tire 260 and the rim 240 to prevent tire 260 from slipping. In the embodiment shown in FIG. 5, the bead lock 250 is spaced from a heel of the tire 260. When the bead lock 250 is spaced from the heel of tire 260, there is no need to account for the radius of the heel when designing the bead lock 250.

Notches 270 can be molded into the tire while the tire is manufactured, or can alternatively be formed after the tire is molded, by a cutting process.

In alternative embodiments (not shown), bead locks 250 and notches 270 can be omitted, and instead the surface of rim 240 can be knurled or provided with a friction pad to prevent tire slippage. In other alternative embodiments (not shown), knurling or friction pads can be provided in addition to bead locks 250 and notches 270.

In other alternative embodiments (not shown), the bead locks project from a surface of the tire bead and the notches are formed in the first and second wheel pieces. In this alternative embodiment, the bead locks could be formed of rubber, and formed on the tire bead while the tire is molded. The bead locks could alternatively be affixed to the tire bead after the tire is molded, through a local vulcanization process or by using an adhesive. The notches in the wheel in this alternative embodiment could be formed by removing material from a completed wheel, or the notches could be formed simultaneous to the forming of the wheel pieces.

Figure 6:
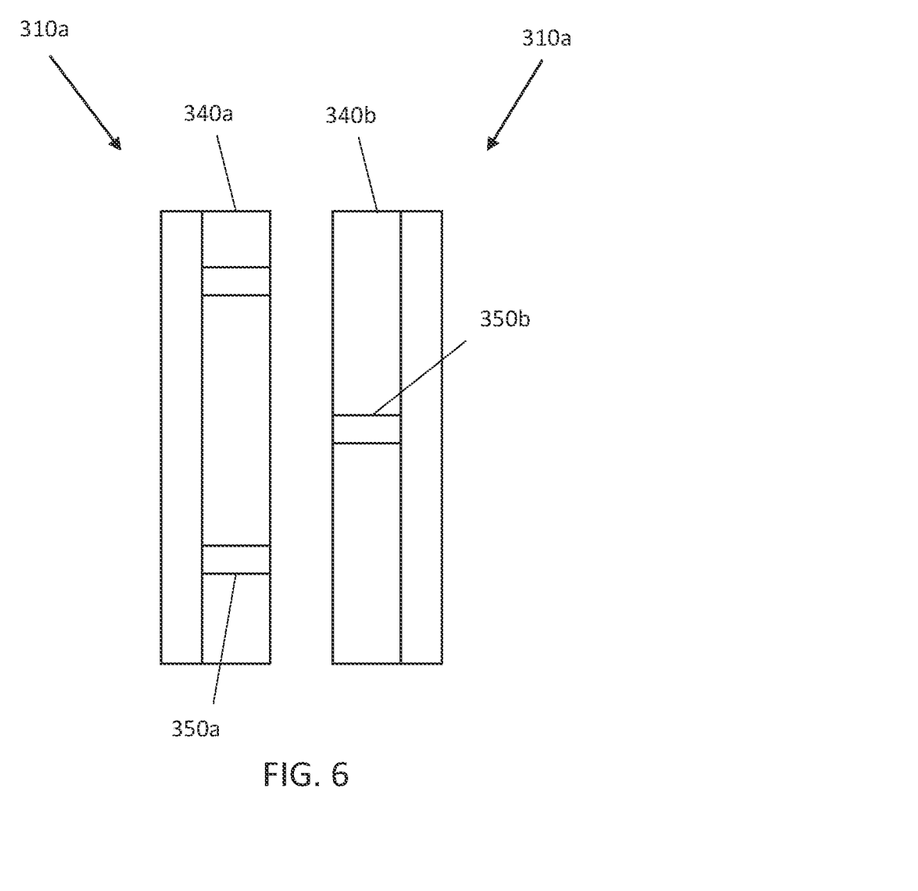
FIG. 6 is a schematic diagram showing a top plan view of one embodiment of a wheel with first and second wheel pieces.

FIG. 6 shows one embodiment of a wheel 300 with a first wheel piece 310a and a second wheel piece 310b. The first wheel piece 310a includes a first rim portion 340a with a first plurality of bead locks 350a that extend across a full width of the first rim portion 340a. The second wheel piece 310b includes a second rim portion 340b with a second plurality of bead locks 350b that extend across a full width of the second rim portion 340b. The first plurality of bead locks 350a are axially misaligned with the second plurality of bead locks 350b.

Although the bead locks and notches described above with respect to a non-pneumatic tire and a two-piece wheel, the bead locks and notches design may be employed on any tire and wheel system. For example, the bead locks and notches described above could be applied to a single piece wheel with a pneumatic tire mounted thereon. Likewise, the bead locks and notches described above could be applied to a single piece wheel with a non-pneumatic tire mounted thereon. Additionally, the bead locks and notches described above could be applied to a two-piece wheel with a pneumatic tire mounted thereon.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A two-piece wheel for mounting a tire, comprising:
a first wheel piece having a first threaded hole;
a second wheel piece having a second threaded hole;
a threaded rod extending through the first threaded hole and the second threaded hole,
   wherein the threaded rod is configured to change the axial distance between the first wheel piece and the second wheel piece when it is turned;
a plurality of bead locks including a first plurality of bead locks equally spaced along a first rim of the first wheel piece and a second plurality of bead locks equally spaced along a second rim of the second wheel piece,
   wherein the first plurality of bead locks includes no more than eight bead locks,
   wherein each of the first plurality of bead locks is oriented substantially parallel to an axis of rotation of the wheel, and has an axial length that is greater than a circumferential width,
   wherein a circumferential distance between adjacent bead locks in the first plurality of bead locks is greater than the circumferential width of each of the first plurality of bead locks,
   wherein the second plurality of bead locks includes no more than eight bead locks,
   wherein each of the second plurality of bead locks is oriented substantially parallel to the axis of rotation of the wheel, and has an axial length that is greater than a circumferential width,
   wherein the second plurality of bead locks are axially misaligned with the first plurality of bead locks,
   wherein a circumferential distance between adjacent bead locks in the second plurality of bead locks is greater than the circumferential width of each of the second plurality of bead locks, and
   wherein the first and second rims are configured to receive the tire.

2. The two-piece wheel of claim 1, wherein at least one bead lock includes a sharp edge.

3. The two-piece wheel of claim 1, wherein at least one bead lock is spaced from an axially outer edge of the wheel piece it is located on.

4. The two-piece wheel of claim 1, wherein the bead locks are located on rim portions of the first and second wheel pieces, and extend across a full width of the rim portions.

5. The two-piece wheel of claim 1, wherein the bead locks are configured to mate with corresponding notches in the tire.

6. A wheel, comprising:
a hub;
a rim portion surrounding the hub, the rim portion having an outer surface,
   wherein the outer surface of the rim portion defines a circumference of the wheel; and
a plurality of bead locks equally spaced along the outer surface of the rim portion, wherein the plurality of bead locks includes no more than eight bead locks on each side of the wheel, wherein each of the plurality of bead locks is oriented substantially parallel to the axis of rotation of the wheel and has an axial length that is greater than a circumferential width, wherein half of the bead locks are located on a first side of the wheel and half of the bead locks are located on a second side of the wheel, wherein the bead locks located on the first side of the wheel are axially misaligned with the bead locks located on the second side of the wheel, and wherein a circumferential distance between adjacent bead locks is greater than the circumferential width of each bead lock.

7. The wheel of claim 6, wherein the bead locks are configured to mate with notches in a tire.

8. The wheel of claim 6, wherein the bead locks are rectangular in cross section.

9. The wheel of claim 6, wherein each bead lock includes a sharp edge.

10. The wheel of claim 6, wherein each bead lock is spaced from an axially outer edge of the wheel.

11. A tire and wheel assembly, comprising:
- a tire,
  - wherein the tire has a bead portion, a sidewall, and a tread,
  - wherein the bead portion is connected to the tread by the sidewall;
- a wheel,
  - wherein the wheel has a hub portion and a rim portion;
- a plurality of bead locks equally spaced along the rim portion of the wheel, wherein the plurality of bead locks includes no more than eight bead locks on each side of the wheel, wherein each of the plurality of bead locks is oriented substantially parallel to the axis of rotation of the wheel and has an axial length that is greater than a circumferential width, wherein half of the bead locks are located on a first side of the wheel, and half of the plurality of bead locks are located on a second side of the wheel, and wherein a circumferential distance between adjacent bead locks is greater than the circumferential width of each bead lock; and
- a plurality of notches located on the bead portion of the tire, corresponding to the plurality of bead locks located on the rim portion of the wheel, wherein the notches and bead locks on the first side of the tire and wheel are axially misaligned with the notches and bead locks on the second side of the tire and wheel.

12. The assembly of claim 11, wherein each of the bead locks has a rectangular cross section.

13. The assembly of claim 11, wherein when the tire is mounted on the wheel, the tire applies an outward force of at least 1000 pounds against the wheel.

\* \* \* \* \*